April 18, 1939.  M. R. FRANKLIN  2,154,839
TRUCK
Filed March 1, 1937
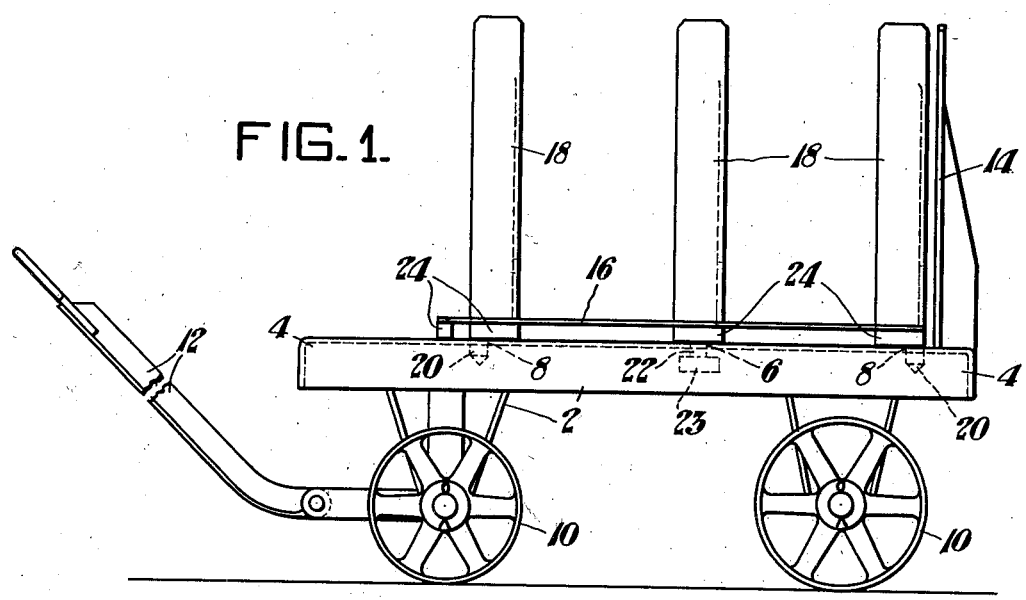
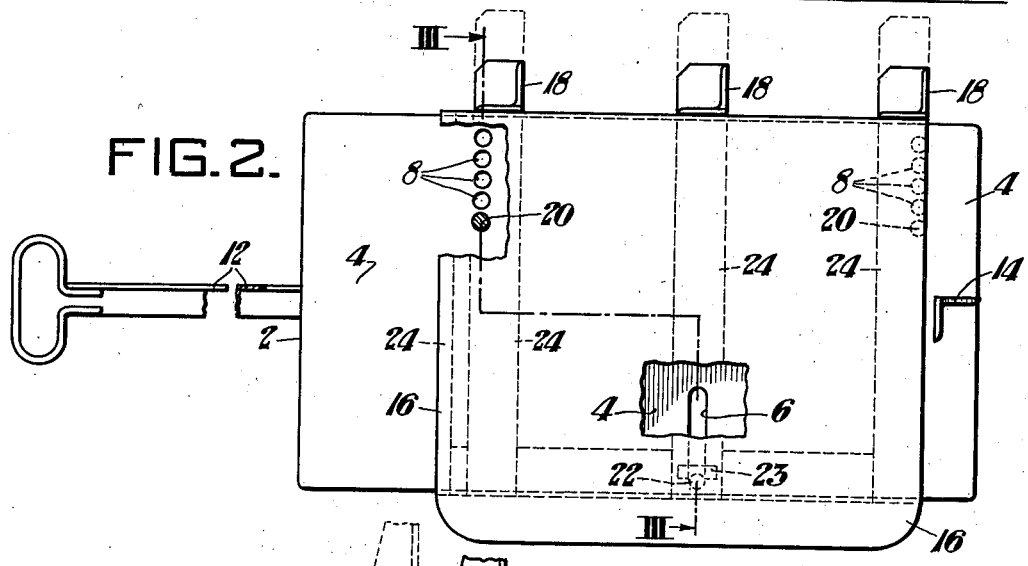
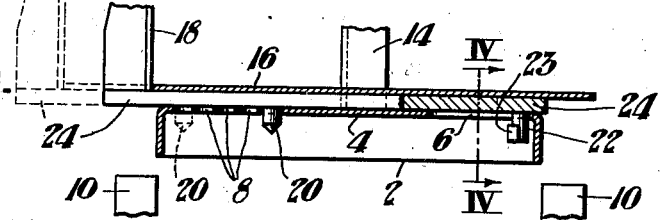
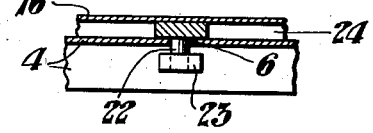
Inventor:
MARVIN R. FRANKLIN,
by: *Usina & Lauber*
his Attorneys.

Patented Apr. 18, 1939

2,154,839

UNITED STATES PATENT OFFICE 2,154,839

TRUCK

Marvin R. Franklin, Elwood, Ind.

Application March 1, 1937, Serial No. 128,511

9 Claims. (Cl. 280—49)

This invention particularly relates to trucks for carrying piles of sheets of wood, metal or other similar material.

One of the objects of this invention is to provide a truck which aids in properly positioning sheets to be carried thereby.

Another object of this invention is to provide a truck which can readily be adjusted to fit the sheets to be carried thereon.

The above and further objects will be made apparent by referring to the following description and the accompanying drawing, in which:

Figure 1 is an elevation of one embodiment of my invention;

Figure 2 is a plan of Figure 4 with portions of the top-plate broken away;

Figure 3 is a transverse sectional elevation on line III—III of Figure 2; and

Figure 4 is a sectional elevation on line IV—IV of Figure 3.

Referring more particularly to the drawing, the numeral 2 indicates generally a truck which has a truck body 4. The truck body 4 is provided with a transversely directed aperture or slot 6 therein and at least two rows 8 of aligned holes therein which are parallel to the slots 6. The holes forming one of the rows 8 are made to correspond to the holes forming the other row 8. The slot 6 and the rows 8 are in opposite sides of the truck body 4. Any suitable supporting means, such as wheels 10, which are secured to the truck body 4 by appropriate means, are provided to rotatively mount the truck 2. A handle 12 should be associated with the truck 2 in order to facilitate movement thereof. An angle 14, or a similar device, is carried by and extends upwardly from the truck body 4 adjacent the rear thereof to serve as a stop for any sheets placed on the truck 2.

A top-plate 16, which is adapted to be carried by the truck body 4, forms the load-carrying surface of the truck 2. Means, such as angles 18, are associated with and extend upwardly from the top-plate 16 adjacent one side thereof. The angles 18 properly position the sides of sheets placed on the top-plate 16 and, in conjunction with the angles 18, they can be used to center sheets placed on the truck 2.

The legs of the angles 14 and 18 extending away from the truck 2 may be beveled near their upper ends, as shown in the drawing.

At least two guide pins 20 are mounted on the bottom surface of the top-plate 16 for engagement with corresponding holes in the rows 8 when the top-plate 16 is on the truck body 4. A lock-bolt 22 is also carried by the bottom surface of the top-plate 16 and is adapted to be placed through the slot 6 when the top-plate 16 is positioned on the truck body 4. A short bar 23 may be welded or otherwise secured to the lock-bolt 22. It will be understood that the lock-bolt 22 is preferably first welded or otherwise secured to the bottom surface of the top-plate 16. The top-plate is then placed on the truck body so that the lock-bolt 22 extends through the slot 6. The bar 23 is then welded or otherwise secured to the lock-bolt 22 to retain the lock-bolt in the slot but permits lateral movement thereof when the top-plate is laterally adjusted. The lock-bolt 22, together with the cross bar 23, thereby retains the top plate loosely in engagement with the truck body and acts to guide the top plate in its lateral movement during the adjustment thereof. The lock-bolt 22 may, if desired, be rotatively carried by the top-plate 16 so that the bar 23 can be turned at right angles to the slot 6 to loosely secure the top-plate 16 to the truck body 4 and at the same time to permit the removal thereof. The position of the top-plate 16 on the truck body 4 can be changed even though the lock-bolt 22 is engaged with the slot 6 by disengaging the guide pins 20 from the holes in the rows 8 with which they are engaged and sliding the top-plate over the truck body 4 until the guide pins 20 engage with other holes in the rows 8. Metal bars 24 may be secured to the bottom surface of the top-plate 16 to enlarge the bearing surface of the top-plate 16 on the truck body 4. The angles 18 may be welded or otherwise secured to the bars 24, if desired.

As the position of the top-plate 16 on the truck body 4 can readily be changed, the position of the angles 18 relative to the angle 14 is variable. Then, because the angles 14 and 18 cooperate to position sheets on the truck 2, their relative positions can be adjusted so that they will center the sheets to be placed on the truck 2.

While I have shown and described one specific embodiment of my invention, it will be understood that I do not wish to be limited exactly thereto since various modifications may be made without departing from the scope of my invention, as defined by the following claims.

I claim:

1. A truck including a truck body having a transversely directed slot therein and at least two rows of aligned holes therein parallel to said slot, said rows having corresponding holes, supporting means for said truck body, means secured to and extending upwardly from said truck body adjacent the rear thereof to position longitudinally articles placed thereon, a top-plate adapted to be carried by said truck body, means associated with and extending upwardly from said top-plate adjacent one side thereof to position laterally articles placed thereon, guide pins mounted on said top-plate for engagement with corresponding holes in said rows to position said top-plate on said truck body, and a lock bolt carried by said top-plate for engagement with said slot to loosely hold said top-plate in engagement with said truck body, said guide pins being constructed and arranged to be disengaged from corresponding holes and engaged with other corresponding holes while said lock bolt is engaged with said slot whereby the relative position of said top-plate on said truck body can be changed.

2. A truck including a body, a top-plate disposed on said body, means for loosely holding said plate in engagement with said body, means for adjusting laterally the position of said plate on said body, and means carried by both said plate and body which are adapted to cooperate directly with articles placed thereon to position the same on said truck body.

3. A truck including a body, a top-plate disposed on said body, means for loosely holding said plate in engagement with said body, means carried by the bottom of said plate which is adapted to cooperate with means arranged on the top of said truck body to position and adjust said plate laterally thereof, and means carried by both said plate and body which are adapted to cooperate directly with articles placed thereon to position the same on said truck body.

4. A truck including a body, a top-plate disposed on said body, means for loosely holding said plate in engagement with said body, said body having at least two transverse parallel rows of aligned holes on the top thereof, said plate having a pair of correspondingly placed pins positioned on the bottom thereof which are adapted to engage with said holes to laterally adjust and position said plate on said body, and means carried by both said plate and body which are adapted to cooperate directly with articles placed thereon to position the same on said truck body.

5. A truck including a body, a top-plate disposed on said body, means for loosely holding said plate in engagement with said body, said body having at least two transverse parallel rows of aligned holes on the top thereof, said plate having correspondingly placed pins positioned on the bottom thereof which are adapted to engage with said holes to transversely adjust and position said plate on said body, an upwardly extending member centrally positioned on said body rearwardly of said plate, and a plurality of upwardly extending members positioned on the side of said plate, said upwardly extending members on both the body and the plate adapted to cooperate with the articles placed thereon to centrally position the same relative to said truck body.

6. A truck comprising a body, a top-plate disposed on said body, means for adjusting laterally the position of said plate on said body, an upwardly extending member arranged at one end of said body, and at least one upwardly extending member arranged on the side of said plate, said upwardly extending members on both the body and the plate adapted to cooperate with articles placed thereon to centrally position the same laterally of said truck so that the load thereon will be properly balanced.

7. A truck comprising a body, a top-plate disposed on said body, means for holding said plate in engagement with said body, means carried by said plate adapted to cooperate with means arranged on said truck body so as to position and adjust said plate relative thereto, upwardly extending means arranged at least on one end of said truck body, and upwardly extending means arranged on at least one side of said plate, said upwardly extending means on both the body and the plate adapted to cooperate with articles placed thereon to centrally position the same relative to said truck body so as to properly balance the load thereon.

8. A truck comprising a body, a top-plate disposed on said body, means for adjusting laterally the position of said plate on said body, means for guiding the movement of said plate thereon in the lateral adjustment thereof, and means carried by both said body and said plate which are adapted to cooperate directly with articles placed thereon to position the same on said truck so that the load thereon will be properly balanced.

9. A truck comprising a body, a top-plate disposed on said body, means for adjusting said plate on said body laterally thereof, upwardly extending means arranged on said body, and upwardly extending means arranged on said plate, said upwardly extending means on both the body and plate adapted to cooperate directly with articles placed thereon to position the same on said truck.

MARVIN R. FRANKLIN.